(12) United States Patent
Ylitalo

(10) Patent No.: US 7,203,519 B2
(45) Date of Patent: Apr. 10, 2007

(54) IMPLEMENTATION METHOD OF PILOT SIGNAL

(75) Inventor: Juha Ylitalo, Oulu (FI)

(73) Assignee: Nokia Corporation, Espoo (FI)

( * ) Notice: Subject to any disclaimer, the term of this patent is extended or adjusted under 35 U.S.C. 154(b) by 680 days.

(21) Appl. No.: 10/294,689

(22) Filed: Nov. 15, 2002

(65) Prior Publication Data

US 2003/0124994 A1 Jul. 3, 2003

Related U.S. Application Data

(63) Continuation of application No. PCT/FI01/00467, filed on May 14, 2001.

(30) Foreign Application Priority Data

May 15, 2000 (FI) ................................. 20001160

(51) Int. Cl.
*H04B 1/38* (2006.01)

(52) U.S. Cl. .................. 455/562.1; 455/63.4; 455/101; 375/299

(58) Field of Classification Search ............... 455/63.1, 455/63.2, 562.1, 575.7, 114.2, 63.4, 101; 370/334; 375/299; *H04Q 7/36*
See application file for complete search history.

(56) References Cited

U.S. PATENT DOCUMENTS

| | | | |
|---|---|---|---|
| 5,577,265 A | 11/1996 | Wheatley, III | |
| 6,028,884 A * | 2/2000 | Silberger et al. | ............ 375/130 |
| 6,038,263 A | 3/2000 | Kotzin et al. | |
| 6,356,771 B1 * | 3/2002 | Dent | ........................ 455/562.1 |
| 6,470,192 B1 * | 10/2002 | Karlsson et al. | ............. 455/561 |
| 2001/0031647 A1 * | 10/2001 | Scherzer et al. | ............. 455/562 |

FOREIGN PATENT DOCUMENTS

| | | | |
|---|---|---|---|
| EP | 0 895 436 A3 | | 7/1999 |
| FI | 98172 | | 1/1997 |
| WO | WO 98/59512 | * | 12/1998 |
| WO | WO 98/59512 A1 | | 12/1998 |
| WO | WO 99/29050 A1 | | 6/1999 |
| WO | WO 01/43309 A2 | | 6/2001 |

OTHER PUBLICATIONS

Ericsson Review No. 3, 1999, Anders Derneryd, Bjorn Johannisson: "Adaptive base-station antenna arrays", pp. 132-137.
Finnish Office Action dated Jun. 5, 2001, and its English translation.

* cited by examiner

*Primary Examiner*—Edward F. Urban
*Assistant Examiner*—Blane Jackson
(74) *Attorney, Agent, or Firm*—Squire, Sanders & Dempsey LLP

(57) ABSTRACT

A method and an apparatus for implementing the method for providing transmission of an uninterrupted pilot signal covering the whole antenna sector. The method uses at least two primary pilot signals orthogonal relative to each other in a radio system comprising adjacent directional antenna beams. In the method, primary pilot signals are transmitted in main antenna beams of the antenna pattern in such a way that adjacent main antenna beams have primary pilot signals orthogonal relative to each other, and the widths and directions of the antenna beams are adjusted in such a way that the beams having the same primary pilot signal do not overlap.

40 Claims, 5 Drawing Sheets

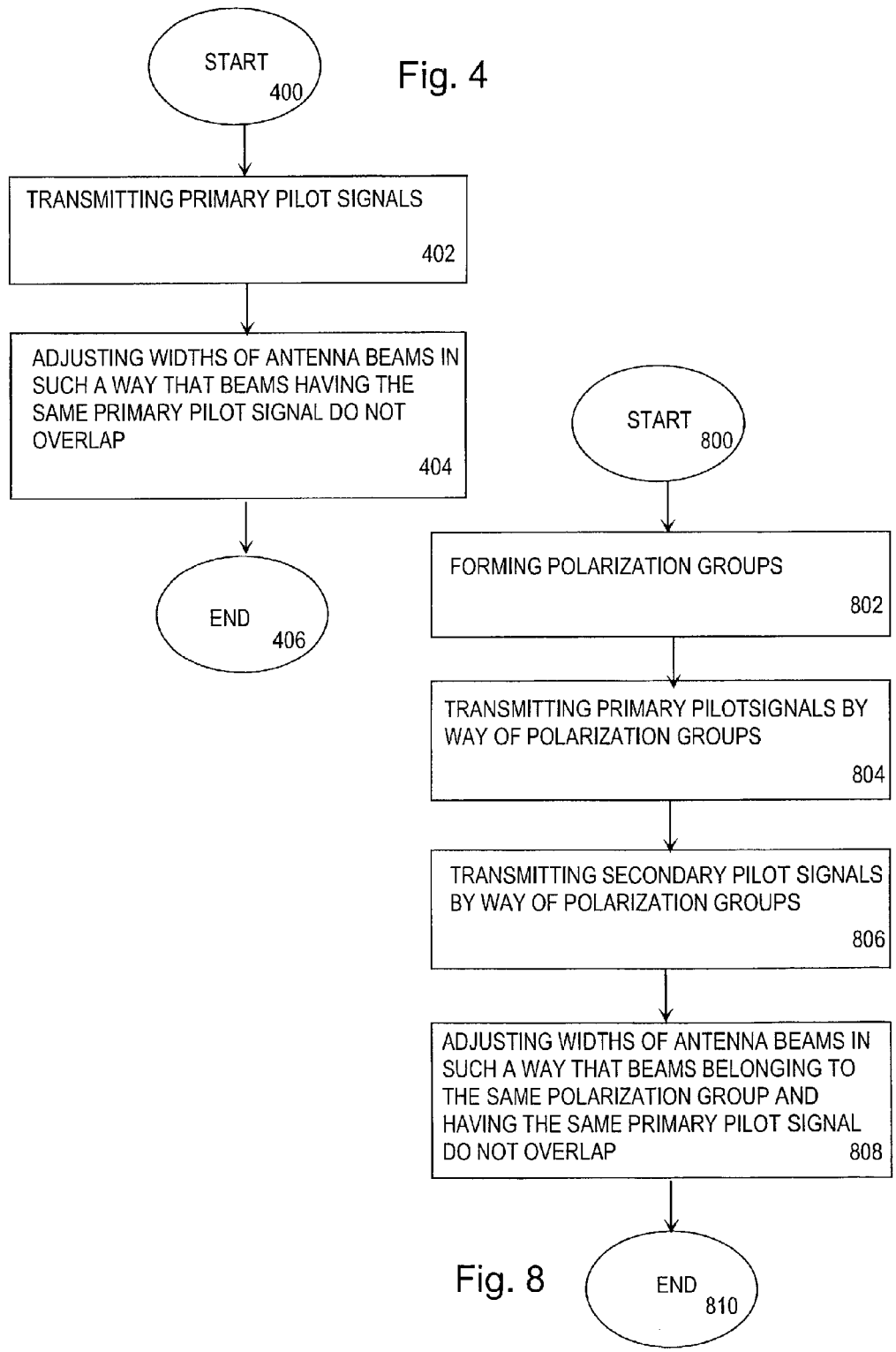

IMPLEMENTATION METHOD OF PILOT SIGNAL

This application is a continuation of international application PCT/FI01/00467 filed May 14, 2001 which designated the US and was published under PCT article 21(2) in English.

FIELD

The invention relates to a method of implementing an uninterrupted pilot signal covering the whole antenna sector.

BACKGROUND OF THE INVENTION

As the number of users of wireless communication systems, such as cellular radio systems, is on the increase, and as rapid data transmission in these systems is becoming more and more common, it is essentially important to increase the capacity of the system by improving the performance of the system. One solution to this problem is to use one or more adaptive antenna arrays instead of sector antennas. In an antenna array, separate antenna elements are typically positioned close to each other, i.e. at about half a wavelength from each other. Typically, there are a sufficient number of antennas in such arrays to achieve the desired coverage area.

When adaptive antenna arrays are used, the basic idea is that narrow radiation beams are used which are directed as directly as possible at the desired receiver. Methods generally known in the use of adaptive antenna arrays can be divided into two main groups: radiation beams are directed at the receiver, or the most suitable beam is selected from several alternative beams. A suitable beam is selected for downlink transmission, or the beam is turned on the basis of the information received from the uplink. The reuse of frequencies can be made more efficient and the power of the transmitter can be reduced, because, owing to the directivity of the antenna beams, interference with other users diminish.

The directing of antenna beams is implemented in the uplink in a digital system by dividing the signal in baseband parts into I and Q branches and by multiplying in a complex manner (phase and amplitude) the signal of each antenna element with appropriate weighting coefficients, and subsequently by summing up the output signals of all antenna elements. The adaptive antenna array comprises in this case not only antennas but also a signal processor, which automatically adapts antenna beams by means of a control algorithm by turning antenna beams to the direction of the strongest signal measured.

The directivity of the beams can also be implemented by analogically generating with fixed phasing (Butler matrix) orthogonal radiation beams, in which the phase increases antenna by antenna. In the method, it is simply measured which beam receives most signal energy, in other words in which beam the signal is strongest, and this beam is then selected for the transmission.

In cellular radio systems, the network part of the radio system, such as a base station, typically transmits one base-station-specific uninterrupted signal or several for example sector-specific uninterrupted signals, called pilot signals in the CDMA system. The subscriber terminal listens to the pilot signal in crossover situations, for example, so as to be able to set up a connection to the base station and thus to the cellular radio network. The pilot signal is a non-data-modulated signal, transmitted with a known spreading code and on the same frequency band as the actual traffic channels. The pilot signal can be distinguished from traffic channels only on the basis of the spreading code. The base station of each system transmits a pilot signal of its own, on the basis of which the subscriber terminals can distinguish the transmissions of different base stations from each other.

The problem is to generate an uninterrupted signal covering the whole antenna sector, because due to the effect of multipath propagation, for example, the signals entering the receiver, when being of opposite phases, cancel each other, and thus a fade maximum is brought about.

U.S. Pat. No. 5,577,265 discloses a system by means of which, using adaptive antenna arrays, the effect of fades can be averaged out, and an uninterrupted pilot signal covering the whole antenna sector can be achieved more reliably. The system comprises an antenna array, which comprises two antennas positioned at a distance shorter than the wavelength of a carrier wave from each other. The phase of the input signal of both antennas is changed, and thus a phase difference is achieved for the signals to be transmitted. Hereby, the occurrence of fades is more random and the fade maximums last a shorter time, but the solution disclosed in the publication cannot eliminate the fades completely.

Another known solution for minimizing the problems caused by fades and for generating an uninterrupted pilot signal covering the whole antenna sector is disclosed in publication Ericsson Review No. 3, 1999. The solution disclosed in the publication is based on the use of separate sector antennas as a part of an adaptive antenna array: the antenna solution comprises not only an array antenna element but also an added radiation element. However, the problem with this solution is that the number of antennas must be increased.

BRIEF DESCRIPTION OF THE INVENTION

An object of the invention is thus to implement a method and an apparatus implementing the method in such a way that an uninterrupted pilot signal covering the whole antenna sector can be transmitted in a preferred manner.

This is achieved with an implementation method of a pilot signal, using at least two primary pilot signals orthogonal relative to each other in a radio system comprising adjacent directional antenna beams. In the method according to the invention, primary pilot signals are transmitted in main antenna beams of an antenna beam pattern in such a way that adjacent main antenna beams have primary pilot signals orthogonal relative to each other; the widths and directions of antenna beams are adjusted in such a way that the beams having the same primary pilot signal do not overlap.

Further, an object of the invention is an implementation method of a pilot signal, using at least two primary pilot signals orthogonal relative to each other in a radio system comprising adjacent directional antenna beams, which antenna beams are formed utilizing polarization antennas. In the method according to the invention, at least two polarization groups are formed in such a way that in the same group the antenna beams have the same polarization and different groups have polarizations different from each other; primary pilot signals in main antenna beams of the antenna beam pattern in the same polarization group are transmitted in such a way that adjacent main antenna beams have primary pilot signals orthogonal relative to each other; the widths and directions of main antenna beams are adjusted in such a way that the beams belonging to the same polarization group and having the same primary pilot signal do not overlap.

Further, an object of the invention is an implementation method of a pilot signal, using at least two primary pilot signals orthogonal relative to each other and at least two secondary pilot signals orthogonal relative to each other in a radio system comprising adjacent directional antenna beams, which are formed utilizing polarization antennas. In the method according to the invention, two polarization groups are formed in such a way that in the same polarization group the antenna beams have the same polarization and different groups have polarizations different from each other; primary pilot signals in main antenna beams of the antenna beam pattern in the first polarization group are transmitted in such a way that adjacent main antenna beams have primary pilot signals orthogonal relative to each other; secondary pilot signals in main antenna beams of the antenna beam pattern in the second polarization group are transmitted in such a way that adjacent main antenna beams have secondary pilot signals orthogonal relative to each other; the widths and directions of main antenna beams are adjusted in such a way that the beams belonging to the same polarization group and having the same pilot signal do not overlap.

Further, an object of the invention is a system for implementing a pilot signal, in which radio system at least two primary pilot signals orthogonal relative to each other and adjacent directional antenna beams are used. The system according to the invention comprises means for transmitting primary pilot signals in main antenna beams of the antenna beam pattern in such a way that adjacent main antenna beams have primary pilot signals orthogonal relative to each other; the system comprises means for adjusting the widths and directions of the antenna beams in such a way that the beams belonging to the same polarization group and having the same primary pilot signal do not overlap.

Further, an object of the invention is a system for implementing a pilot signal, in which radio system at least two primary pilot signals orthogonal relative to each other and adjacent directional antenna beams are used, which directional antenna beams are formed utilizing polarization antennas. The system according to the invention comprises means for forming at least two polarization groups in such a way that in the same group the antenna beams have the same polarization and different groups have polarizations different from each other; the system comprises means for transmitting primary pilot signals in main antenna beams of the antenna beam pattern in the same polarization group in such a way that adjacent main antenna beams have primary pilot signals orthogonal relative to each other; the system comprises means for adjusting the widths and directions of the antenna beams in such a way that the beams belonging to the same polarization group and having the same primary pilot signal do not overlap.

Further, an object of the invention is a system for implementing a pilot signal, which radio system uses at least two primary pilot signals orthogonal relative to each other and at least two secondary pilot signals orthogonal relative to each other, and adjacent directional antenna beams, which are formed utilizing polarization antennas. The system according to the invention comprises means for forming two polarization groups in such a way that in the same group the antenna beams have the same polarization and different groups have polarizations different from each other; the system comprises means for transmitting primary pilot signals in main antenna beams of the antenna beam pattern in the first polarization group in such a way that adjacent main antenna beams have primary pilot signals orthogonal relative to each other; the system comprises means for transmitting secondary pilot signals in main antenna beams of the antenna beam pattern in the second polarization group in such a way that adjacent main antenna beams have secondary pilot signals orthogonal relative to each other; the system comprises means for adjusting the widths and directions of the antenna beams in such way that the beams belonging to the same polarization group and having the same pilot signal do not overlap.

Preferred embodiments of the invention are disclosed in the dependent claims.

The invention is based on the idea that a radio system is used which can utilize at least two primary pilot signals (primary CPICH, Common Pilot Channel) orthogonal relative to each other, or at least two primary pilot signals orthogonal relative to each other and at least two secondary pilot signals (secondary CPICH) orthogonal relative to each other. Such a radio system is for example the UMTS, in which the WCDMA (Wide Band Code Division Multiple Access) method is used. Each antenna sector has at least one primary pilot signal to be transmitted uninterruptedly, so that the subscriber terminal is successfully switched to the traffic channel in a crossover or handover situation.

A plurality of advantages are achieved by means of the method and system according to the invention. In the method according to the invention, coverage of the whole antenna sector can be created for the pilot signal without nulls in the antenna gain, i.e. shadow regions, without increasing the number of antennas. In addition, the subscriber terminal, such as a telephone, can measure neighbouring signals also in a multi-beam system. Correspondingly, transmit diversity is possible also in narrow beams. Furthermore, when fixed beamforming is used, the advantage is that no calibration is required in the transmission system, because the pilot signals summed up on the interface of the antenna beams are not the same and thus they do not cancel each other and result in a shadow region.

BRIEF DESCRIPTION OF THE FIGURES

The invention will now be described in greater detail in connection with preferred embodiments, with reference to the attached drawings, in which

FIG. 4 is a flow chart showing method steps for implementing an uninterrupted pilot signal covering the whole antenna sector when the beams have the same polarization;

FIG. 8 is a flow chart showing method steps for implementing an uninterrupted pilot signal when the beams have different polarizations and both a primary pilot and a secondary pilot are used.

DETAILED DESCRIPTION OF THE INVENTION

Figure 1:
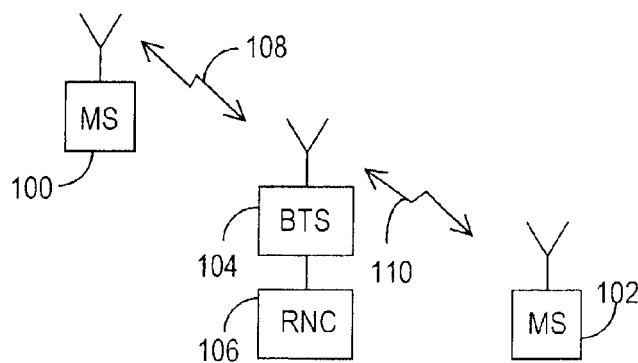
FIG. 1 shows an example of a telecommunications system.

FIG. 1 shows in a simplified manner one digital data transmission system to which a solution according to the invention can be applied. It is a part of a cellular radio system comprising a base station 104, which is in a bidirectional connection 108 and 110 with subscriber terminals 100 and 102, which can be fixedly mounted, mounted on a vehicle, or portable terminals. There is a connection from the transceivers of the base station to an antenna unit by means of which the bidirectional radio connection to the subscriber terminal is implemented. The base station is further in connection with a base station controller 106, which transmits the connections of the terminals to the rest of the network or to a public switched telephone network. The base station controller controls in a centralized manner several base stations in connection therewith. A control unit in the base station controller performs call control, mobility management, collection of statistical data and signalling.

In the method and the system implementing the method, described in the following, directional antenna beams and antenna sectors are used. In the disclosed method and system, polarization antennas can also be utilized.

FIG. 4 shows as a flow chart the method steps for implementing an uninterrupted pilot signal covering the whole antenna sector, when the beams have the same polarization. The performance of the method starts in block 400. Next, in block 402, the pilot signals of the adjacent antenna beams are defined orthogonal relative to each other, so that they are uncorrelated and do not therefore interfere with each other. In block 404, the widths of the antenna beams are adjusted in such a way that the beams having the same primary pilot do not overlap. Shadow areas for the primary pilot signal are not brought about in a situation where the primary pilot signals of adjacent beams are orthogonal relative to each other, and those beams that have the same primary signal do not overlap, because when summed up on the interface of the beams, the primary pilot signals are not the same, nor of the opposite phase. The performance of the method is terminated in block 406.

Figure 5A:
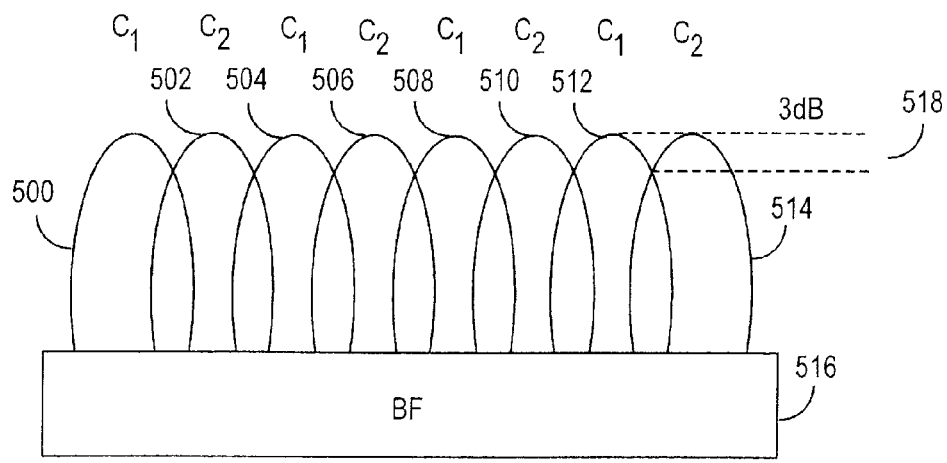
FIGS. 5a to 5c show the order of pilot signals when adjacent beams have the same polarization.
Figure 5B:
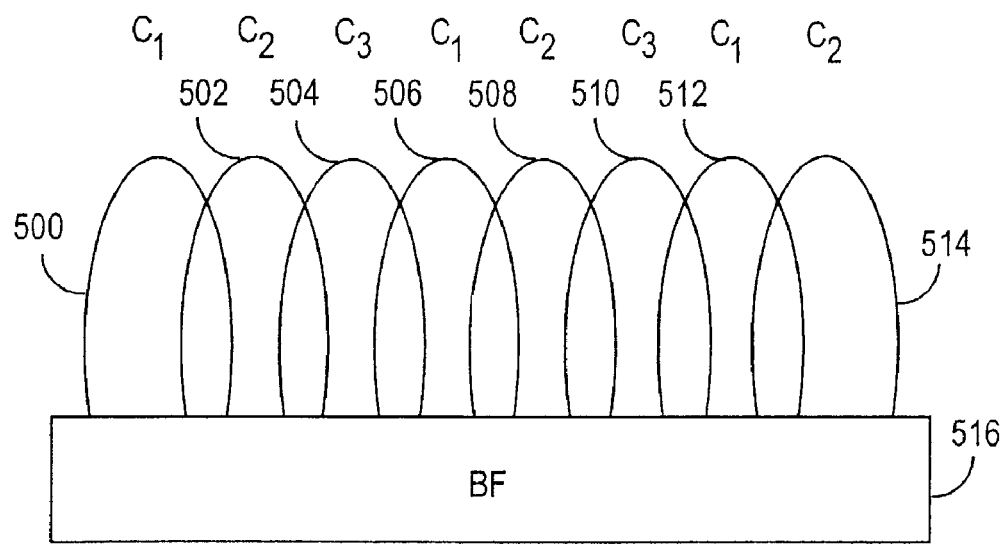
Figure 5C:
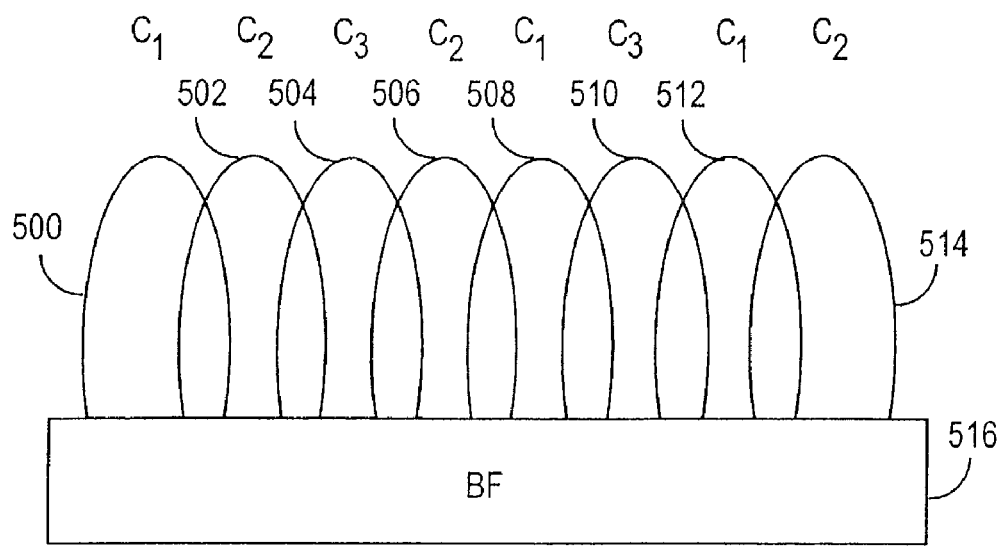

FIGS. 5a to 5c illustrate a situation where the adjacent beams having the same polarization have different primary pilot signals. FIG. 5a shows a situation where two primary pilot signals $C_1$ and $C_2$ orthogonal relative to each other are used. In the figure, the different antenna beams are 500, 502, 504, 506, 508, 510, 512 and 514. In the situation of FIG. 5, the antenna gain falls about 3 dB from its maximum value at the intersection 518 of two adjacent beams. 516 comprises antenna elements and means for directing antenna beams, for example a Butler matrix. The primary pilot signals can be made orthogonal relative to each other for example by selecting A, A, A, A, each of these being for example number one, as the modulation pattern for the primary pilot signal of the first antenna in Figure $C_1$; and A, −A, −A, A, A, −A, −A, for example an equal number of number ones and zeros, for the primary pilot signal of the second antenna in Figure $C_2$, where A=1+j. The figure shows that the primary pilots of adjacent antennas are different. It is obvious that the method can be applied also using more than two primary pilot signals orthogonal relative to each other. Also, different primary pilot signals can be used in each beam. Thus, the number of different pilot signals can be selected to be suitable for a particular situation. FIGS. 5a to 5c show how primary pilot signals can be positioned in different beams when three primary pilot signals $C_1$, $C_2$ and $C_3$ orthogonal relative to each other are used. It is not necessary to transmit all primary pilot signals in use in several main antenna beams of the antenna pattern. Neither is it necessary to reuse signals in a particular order, but in the second beams the most suitable ones of the available signals can be selected in each particular case to be re-transmitted.

Figure 7:
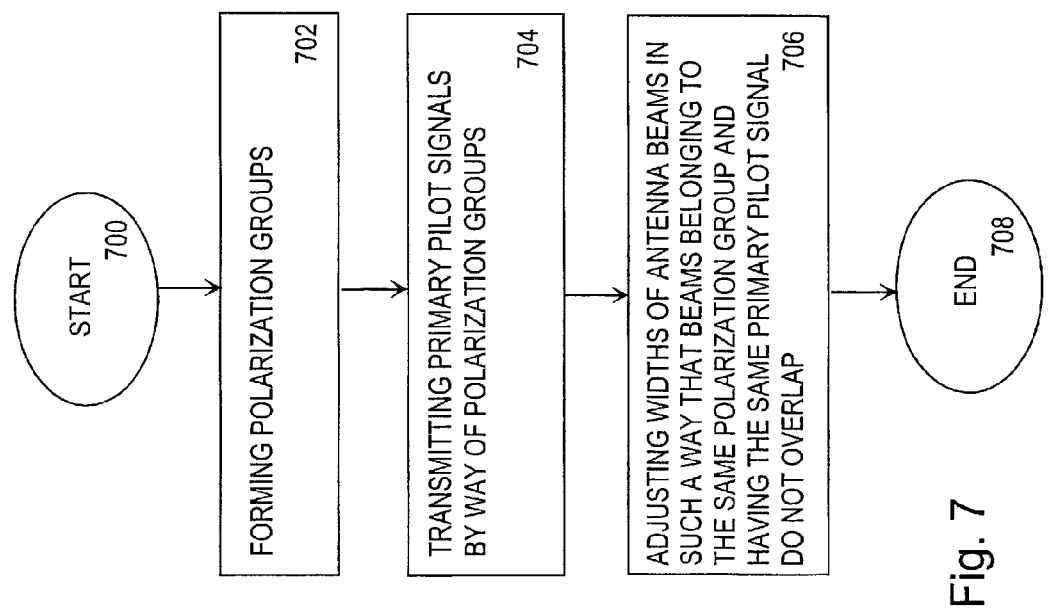
FIG. 7 is a flow chart showing method steps for implementing an uninterrupted pilot signal covering the whole antenna sector when the beams have different polarizations and only a primary pilot is used.

FIGS. 7 and 8 show a flow chart of the method steps for implementing an uninterrupted pilot signal covering the whole antenna sector when the beams have at least two different polarization groups. The method of FIG. 7 can be applied if the subscriber terminal has dual-polarized transmitter antennas available. Thus, no separate secondary pilot signals different from the primary pilot signals are needed, because the subscriber terminal can distinguish the signals of different beams from each other by means of polarization. The performance of the method starts in block 700. In block 702, at least two polarization groups are defined in such a way that in the same group the antenna beams have the same polarization, and different groups have polarizations different from each other. Next, in block 704, the primary pilot signals of adjacent antenna beams are defined orthogonal relative to each other, so that they are uncorrelated and do not interfere with each other. In block 706, the widths of the antenna beams are adjusted in such a way that the beams belonging to the same polarization group and having the same primary pilot do not overlap. Thus, no shadow regions are brought about for primary pilot signals, because the primary pilot signals of adjacent beams are orthogonal relative to each other, and those beams that have the same primary pilot do not overlap. The performance of the method is terminated in block 708.

The flow chart of FIG. 8 shows how a combination of a primary pilot signal and a secondary pilot signal is used to achieve an uninterrupted pilot signal, whereby no dual polarization antennas are needed in the subscriber terminal. The performance of the method starts in block 800. In block 802, two polarization groups are defined in such a way that in the same group the antenna beams have the same polarization, and different groups have polarizations different from each other. Next, in block 804, a primary pilot signal is defined for the first polarization group and a secondary pilot signal for the second polarization group in such a way that the pilot signals of adjacent beams belonging to the same polarization group are orthogonal relative to each other. Finally, in block 806 the widths of the antenna beams are adjusted in such a way that the beams belonging to the same polarization group and having the same primary pilot do not overlap. The performance of the method is terminated in block 808.

Figure 6A:
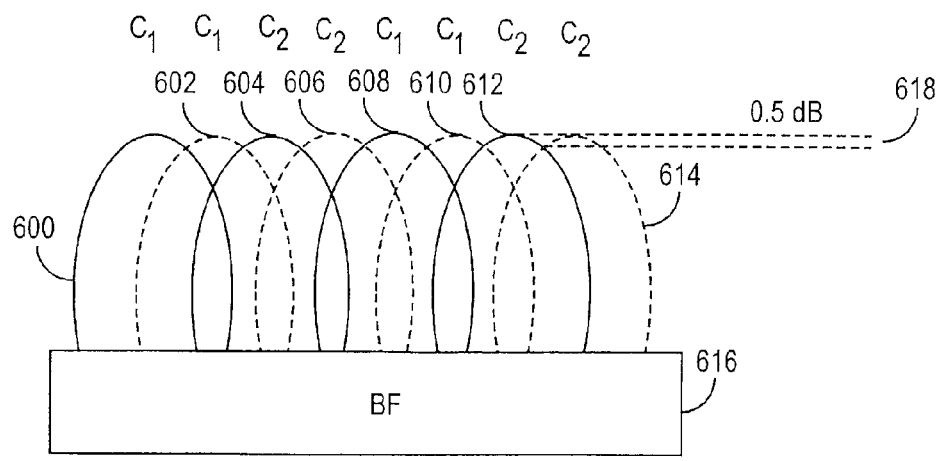
FIGS. 6a to 6b show the order of pilot signals when adjacent beams have different polarizations.
Figure 6B:
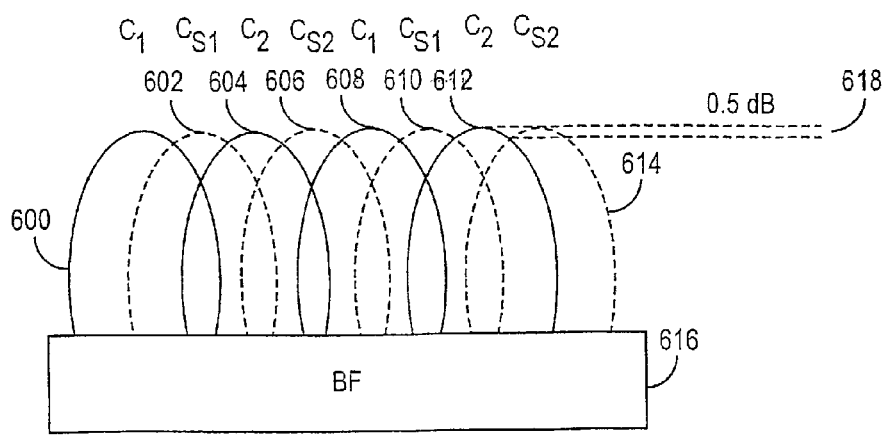

FIGS. 6a to 6b illustrate a situation where polarization groups can be utilized in the generation of pilot signals. FIG. 6a shows a situation where the subscriber terminal has dual-polarized receiver antennas available. Thus, no separate secondary pilot signals different from primary pilot signals are needed, because the subscriber terminal can distinguish the signals of different beams from each other by means of polarization. In the figure, the antenna beams having the same polarization are 600, 604, 608 and 612. The second polarization group is formed of beams 602, 606, 610 and 614. In FIG. 6a, the difference between the maximum and minimum of the antenna gain is smaller than in FIG. 5, i.e. approximately 0.5 dB, because antenna beams in the second polarization group can be turned in such a way that the maximum values of the beams in the second polarization group are at the point of the minimum values 618 of the beams in the second polarization group. 616 comprises antenna elements and means for directing antenna beams, in this case for example two Butler matrices, for forming different polarization groups. In this case, too, the primary pilot signals can be made orthogonal relative to each other, for example by selecting A, A, A, A as the modulation pattern for the primary pilot signal of the first antenna in FIG. $C_1$, and A, −A, −A, A, A, −A, −A for the primary pilot signal of the second antenna in FIG. $C_2$, where A=1+j. It can be seen from FIG. 6a that the primary pilot signals are positioned by way of polarization groups in such a manner that the adjacent beams in the same polarization groups have different primary pilot signals. It is obvious that in this case, too, the method can be applied using more than two primary pilot signals orthogonal relative to each other. Also, different primary pilot signals can be used in each beam. Thus, the number of different pilot signals can be selected to be suitable for each particular case. It is not necessary to transmit all primary pilot signals in use in several main antenna beams of the antenna pattern. Neither is it necessary to reuse signals in a particular order, but in the second beams the most suitable ones of the available signals can be selected in each particular case to be re-transmitted.

In the situation of FIG. 6b, polarization diversity can be utilized by setting a primary pilot for a beam belonging to the first polarization group and a secondary pilot formed of the primary pilot for a beam belonging to the second polarization group. In the figure, the first polarization group is formed of the antenna beams 600, 604, 608 and 612. The second polarization group is formed of the beams 602, 606, 610 and 614. Also in FIG. 6b, the difference between the maximum and minimum of the antenna gain is smaller than in FIG. 5, i.e. approximately 0.5 dB, because antenna beams of the second polarization group can be turned in such a way that the maximum values of the beams in the second polarization group are at the point of the minimum values 618 of the beams in the second polarization group. 616 comprises antenna elements and means for directing antenna beams, in this case for example two Butler matrices, for forming different polarization groups. When polarization-group-specific pilot signals are used, in this case primary pilots for the first polarization group and secondary pilots formed of primary pilots for the second polarization group, the subscriber terminal does not need to have dual-polarized antennas available. In this case, a secondary pilot is set for example by determining that the secondary pilot signal has the same modulation pattern as the primary pilot signal but it is spread with a different channel code. The secondary pilot signal can also be formed using the same modulation pattern but a scrambling code different from the scrambling code of the primary pilot. The network part of the radio system, such as a base station, transmits to the subscriber terminal information on secondary pilots being used, too, so that the subscriber terminal listens not only to the primary pilot signal but also to the secondary pilot signal. In FIG. 6b, $C_1$ and $C_2$ denote primary pilot signals and $C_{s1}$ and $C_{s2}$ secondary pilot signals. The figure shows that in the different beams belonging to the first polarization group the primary pilot signals alternate $C_1$, $C_2$, $C_1$ $C_2$ and so on. In the beams belonging to the second polarization group the secondary pilot signals alternate $C_{s1}$, $C_{s2}$, $C_{s1}$, $C_{s2}$ and so on. The method can be applied also using more than two primary pilot signals or secondary pilot signals orthogonal relative to each other. Also, different primary and secondary pilot signals can be used in each beam. Thus, the number of different pilot signals can be selected to be suitable for each particular case. It is not necessary to transmit all primary or secondary pilot signals in use in several main antenna beams of the antenna pattern. Neither is it necessary to reuse signals in a particular order, but in the second beams, the most suitable ones of the available signals can be selected in each particular case to be re-transmitted.

In addition, other methods can be used to distinguish pilot signals, such as transmitting the same pilot signal with adjacent beams but in such a way that the pilot signal of every other beam is delayed, for example in spread spectrum systems by the chip time. The chip time refers to the inverse of the chip rate; for example in a WCDMA system it is 1/3, 84 MHz. Thus, if secondary pilots are used in addition to primary pilots, the secondary pilot of every other beam is transmitted delayed.

In addition, pilot signals used in the radio system can be used, when necessary, for measuring neighbouring cells and estimating the channel. Parallel to the pilot signal, data intended for all users of the radio system or for the whole radio cell can be transmitted with the same delay.

Figure 2:
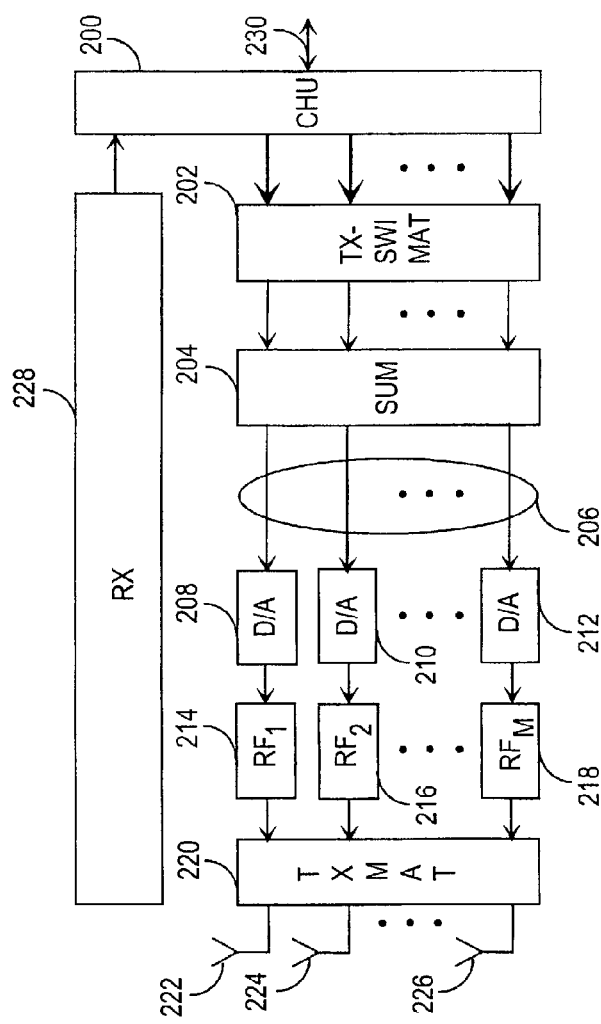
FIG. 2 shows a simplified example of a transmitter with which directional antenna beams are implemented with fixed phasing.

FIG. 2 illustrates a simplified example of a transmitter which implements directed antenna beams with fixed phasing (Butler matrix), and an uninterrupted pilot signal covering the whole antenna sector. The illustration concentrates on showing transmitter parts required for directing antenna beams and forming a pilot signal. The transmitter comprises a desired number of channel units 200, which are in connection with a receiver 228. The channel units determine the inlet angles and delay of the received signal so as to find the best transmission angles. A signal 230 entering the channel unit in the transmitter is a data bit sequence which is modulated and encoded, and in spread-spectrum systems, e.g. in systems using the WCDMA method, also spread-encoded into wideband by the channel units. The channel unit also generates at least one pilot signal, which is a non-data-modulated signal transmitted with a certain known spreading code, which signal is transmitted by the network part of a radio system, such as a base station, at the same frequency band as the one used by the actual traffic channels, from which the pilot signal can be distinguished on the basis of the spreading code. If both primary and secondary pilot signals are in use, the channel unit generates both. The signal to be transmitted from the channel units is taken to a TX switching unit 202, which routes the signals to be transmitted to be summed up to each antenna beam. If polarization antennas are in use, each antenna beam belongs to one of the two polarization groups. The channel units perform the control required. From the TX switching unit the signals are taken to a summing unit 204, in which the signals assigned to each beam are digitally summed up. Signals 206, which are, in other words, summed signals assigned to each beam, are converted into an analogue format in D/A converters 208, 210 and 212. In radio frequency parts 214, 216 and 218, the signals are up-converted to the desired transmission frequencies and amplified to correspond to the power level requirement for the radio path. The input of a TX matrix 220 comprises M pieces of signals, which are aligned by the TX matrix in such a way that antenna beams in different directions are received from antennas, the directions of which antenna beams are fixed, and which antenna beams cover together the desired area and form the desired radiation pattern. It is to be noted that the number M of antenna beams created with the TX matrix is not necessarily the same as the number N of antenna elements. The TX matrix is usually implemented by means of the Butler matrix. The transmitter comprises a given number N of antenna elements 222, 224 and 226, which can also be shared with the receiver (the Duplex solution). The antenna elements are arranged for example in a linear or planar manner.

In a linear manner, the elements can be arranged for example as an ULA (Uniform Linear Array), in which the elements are positioned on a straight line at equal distances from each other. In a planar manner, for example a CA (Circular Array) can be formed, in which the elements are positioned at the same level, for example horizontally in the form of the periphery of a circle. In this case, a given section of the periphery of the circle is covered, for example 120 degrees, or up to the whole 360 degrees. Also two- or three-dimensional structures can, in principle, be made of the above-mentioned uniplanar antenna structures. A two-dimensional structure, for example, is formed by positioning ULA structures next to each other, whereby a matrix is formed of the elements.

Figure 3:
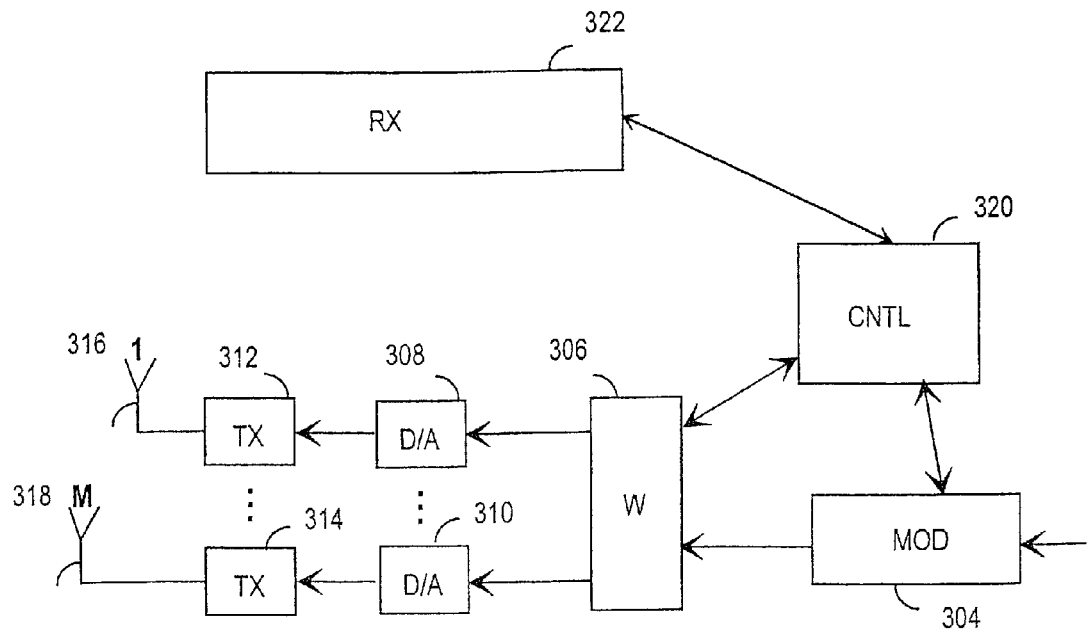
FIG. 3 shows a simplified example of a transmitter with which directional antenna beams are implemented with digital beamforming methods.

The example of FIG. 2 shows an analogue implementation for directing antenna beams. FIG. 3 shows a simplified transmitter, which allows implementation of digital directing of antenna beams and an uninterrupted pilot signal covering the whole antenna sector. The illustration concentrates on showing transmitter parts required for directing antenna beams and forming a pilot signal, as well as for transmitting. The antenna pattern of the signal is directed with a digital phasing of the signal, whereby the antenna elements do not have to be mechanically directable. Hence, the direction of the subscriber terminal 100, 102 is expressed as a complex vector, which is formed of an elementary unit corresponding to each antenna element and usually expressed as a complex number.

An antenna array using directed antenna beams comprises several separate elements 316 and 318. There may be K pieces of antenna elements, whereby K is an integer greater than one. The transmission can utilize the same antenna elements as the reception, or there can be separate antenna elements for the transmission, as is the case in the figure. Also, the antenna elements are in this implementation option arranged for example in a linear or planar manner. If polarization antennas are used, the antenna beams of each antenna element belong to one of the two polarization groups.

The transmitter of the network part of the radio system comprises a modulation block 304, which modulates the carrier wave with a data signal containing the desired information in accordance with the selected modulation method. The modulation block performs measures to process speech of the user or data generated by the user, for instance DSP processing (Digital Signal Processing), by means of which information to be transmitted is encoded and encrypted. In channel coding, systematic bit redundancy is added to the signal, typically parity bits, which are used for detecting and correcting errors in a decoder. In speech coding, non-systematic redundancy in source symbols is typically removed to reduce the required bit rate. Further, in spread-spectrum systems, such as in the WCDMA, the spectrum of the signal is spread to a wide band in the transmitter by means of a pseudo-noise spreading code. The modulation block also generates at least one pilot signal, which is a non-data-modulated signal transmitted with a certain known spreading code, the signal being transmitted by the network part of the radio system, such as a base station, at the same frequency band as the one used by the actual traffic channels, from which signal a pilot signal can be distinguished only on the basis of the spreading code. If both primary pilot signals and secondary pilot signals are used, the channel unit generates both.

The modulation block also generates at least one pilot signal, which is a non-data-modulated signal transmitted with a certain known spreading code, the signal being transmitted by the network part of the radio system, such as a base station, at the same frequency band as the one used by the actual traffic channels, from which signal a pilot signal can be distinguished only on the basis of the spreading code.

In order to direct antenna beams, each separate digital sampled signal is multiplied with a weighting coefficient of the antenna element, usually in complex format, in weighting means 306. In this way, the antenna beam can in the digital phasing be directed in the direction of a complex vector formed of elementary units. Determination of the weighting coefficient utilizes measurements of the received signal, such as position information of the subscriber device, for instance determination of the input angles and delay of the received signal, performed by a receiver 322. The weighting coefficients are selected according to a typically adaptive algorithm in such a way that the desired radiation pattern is achieved. A control block 320 controls the operation of the transceiver, such as the modulation block and weighting means.

Each signal component is transferred to the transmitter corresponding to each antenna element. The transmitter comprises D/A converters 308 and 310, which convert the digital signal into an analogue signal. The transmitter further comprises RF parts 312 and 314, in which the signal is up-converted to the selected transmission frequency. The RF parts also comprise filters that restrict the band width and amplifiers of the output in the transmitter in band-restricted systems in order to amplify the signal to be transmitted to the selected power level.

The functions described above for implementing an uninterrupted pilot signal covering the whole antenna sector can be implemented in a plurality of ways, for example with a software or hardware implementation performed by a processor, such as with a logic constructed of separate components, or with the ASIC (Application Specific Integrated Circuit).

The transmitter further arranges the signal to be transmitted and the signalling information in accordance with the air interface standard of the radio system.

Although the invention has been described above with reference to the example according to the attached drawings, it is obvious that the invention is not confined thereto but can be modified in a plurality of ways within the inventive idea defined in the attached claims.

We claim:

1. An implementation method of a pilot signal, using at least two pilot signals orthogonal relative to each other in a radio system comprising adjacent directional antenna beams, which are formed by utilizing polarization antennas, said method comprising:

forming at least two polarization groups in such a way that in the same group the antenna beams have the same polarization, and different groups have polarizations different from each other;

transmitting primary pilot signals in main antenna beams of the antenna beam pattern in the same polarization group in such a way that adjacent main antenna beams have primary pilot signals orthogonal relative to each other; and adjusting the widths and directions of the main antenna beams in such a way that the beams belonging to the same polarization group and having the same primary pilot signal do not overlap.

2. A method according to claim 1, wherein all primary pilot signals in use are transmitted in several main antenna beams of the antenna pattern.

3. A method according to claim 1, wherein some of the primary pilot signals in use are transmitted in several main antenna beams of the antenna pattern.

4. A method according to claim 1, wherein different primary pilot signals are transmitted in the main antenna beams of the antenna pattern in a predetermined order.

5. A method according to claim 1, wherein the primary pilot signals of adjacent main antenna beams of the antenna pattern are defined orthogonal relative to each other by selecting for the primary pilot signals modulation patterns comprising pilot symbols and being orthogonal relative to each other.

6. A method according to claim 1, wherein the primary pilot signals are defined orthogonal relative to each other by selecting different spreading codes for adjacent main antenna beams.

7. A method according to claim 1, wherein the primary pilot signals of adjacent antenna beams are transmitted with different delays in such a way that the primary pilot signal of every other main antenna beam is delayed by a chip time.

8. A method according to claim 1, wherein different scrambling codes are defined for the primary pilot signals of adjacent main antenna beams.

9. A method according to claim 1, wherein data intended for all users of the radio system or for a radio cell is transmitted in parallel with the primary pilot signal and with a corresponding delay.

10. An implementation method of a pilot signal using at least two primary pilot signals orthogonal relative to each other and at least two secondary pilot signals orthogonal relative to each other in a radio system comprising adjacent directional antenna beams, which are formed utilizing polarization antennas, said method comprising:
  forming two polarization groups in such a way that in the same group the antenna beams have the same polarization, and different groups have polarizations different from each other;
  transmitting primary pilot signals in the main antenna beams of the antenna beam pattern in the first polarization group in such a way that adjacent main antenna beams have primary pilot signals orthogonal relative to each other; and
  transmitting secondary pilot signals in the main antenna beams of the antenna beam pattern in the second polarization group in such a way that adjacent main antenna beams have secondary pilot signals orthogonal relative to each other; and
  adjusting the widths and directions of main antenna beams in such a way that the beams belonging to the same polarization group and having the same pilot signal do not overlap.

11. A method according to claim 10, wherein all secondary pilot signals in use are transmitted in several main antenna beams of the antenna pattern.

12. A method according to claim 10, wherein some of the secondary pilot signals in use are transmitted in several main antenna beams of the antenna pattern.

13. A method according to claim 10, wherein different secondary pilot signals are transmitted in main antenna beams of the antenna beam pattern in a predetermined order.

14. A method according to claim 10, wherein one of the secondary pilot signals has a spreading code different from that of the primary pilot signals.

15. A method according to claim 10, wherein the secondary pilot signals are defined orthogonal relative to each other by selecting different spreading codes for adjacent main antenna beams.

16. A method according to claim 10, wherein the secondary pilot signals of adjacent main antenna beams of the beam pattern are defined orthogonal relative to each other by selecting for the secondary pilot signals modulation patterns comprising pilot symbols and being orthogonal relative to each other.

17. A method according to claim 10, wherein different scrambling codes are defined for the secondary pilot signals of adjacent main antenna beams.

18. A method according to claim 10, wherein the secondary pilot signals of adjacent main antenna beams are transmitted with different delays in such a way that a secondary pilot signal of every other main antenna beam is delayed by a chip time.

19. A method according to claim 10, wherein data intended for all users of the radio system or for a radio cell is transmitted in parallel with the secondary pilot signal and with a corresponding delay.

20. A system for implementing a pilot signal, wherein at least two primary pilot signals orthogonal relative to each other and adjacent directional antenna beams are used, which directional antenna beams are formed by utilizing polarization antennas, said system comprising:
  means for forming at least two polarization groups in such a way that in the same group the antenna beams have the same polarization, and different groups have polarizations different from each other;
  means for transmitting primary pilot signals in main antenna beams of the antenna beam pattern in the same polarization group in such a way that adjacent main antenna beams have primary pilot signals orthogonal relative to each other; and
  means for adjusting widths and directions of the antenna beams in such a way that the beams belonging to the same polarization group and having the same primary pilot signal do not overlap.

21. A system according to claim 20, further comprising means for transmitting all primary pilot signals in use in several main antenna beams of the antenna pattern.

22. A system according to claim 20, further comprising means for transmitting some of the primary pilot signals in use in several main antenna beams of the antenna beam pattern.

23. A system according to claim 20, further comprising means for transmitting different primary pilot signals in main antenna beams of the antenna beam pattern in a predetermined order.

24. A system according to claim 20, further comprising means for defining the primary pilot signals of adjacent main antenna beams of the antenna pattern orthogonal relative to each other by selecting for the pilot signals modulation patterns comprising pilot symbols and being orthogonal relative to each other.

25. A system according to claim 20, further comprising means for defining primary pilot signals orthogonal relative to each other by selecting different spreading codes for adjacent main antenna beams.

26. A system according to claim 20, further comprising means for defining different scrambling codes for the primary pilot signals of adjacent main antenna beams.

27. A system according to claim 20, further comprising means or transmitting the primary pilot signals of adjacent main antenna beams with different delays in such a way that the primary pilot signal of every other main antenna beam is delayed by a chip time.

28. A system according to claim 20, further comprising means for transmitting data intended for all users of the radio system or for a radio cell in parallel with the primary pilot signal and with a corresponding delay.

29. A system for implementing a pilot signal, wherein at least two primary pilot signals orthogonal relative each other, at least two secondary pilot signals orthogonal relative to each other and adjacent directional antenna beams are used, which directional antenna beams are formed utilizing polarization antennas, said system comprising:
   means for forming two polarization groups in such a way that in the same group the antenna beams have the same polarization, and different groups have polarizations different from each other;
   means for transmitting primary pilot signals in main antenna beams of the antenna beam pattern in the first polarization group in such a way that adjacent main antenna beams have primary pilot signals orthogonal relative to each other;
   means for transmitting secondary pilot signals in main antenna beams of the antenna beam pattern in the second polarization group in such a way that adjacent main antenna beams have secondary pilot signals orthogonal relative to each other; and
   means for adjusting widths and directions of the antenna beams in such a way that beams belonging to the same polarization group and having the same pilot signal do not overlap.

30. A system according to claim 29, further comprising means for transmitting all secondary pilot signals in use in several main antenna beams of the antenna pattern.

31. A system according to claim 29, further comprising means for transmitting some of the secondary pilot signals in use in several main antenna beams of the antenna pattern.

32. A system according to claim 29, further comprising means for transmitting different secondary pilot signals in main antenna beams of the antenna beam pattern in a predetermined order.

33. A system according to claim 29, wherein the secondary pilot signal has a spreading code different from that of the primary pilot signal.

34. A system according to claim 29, further comprising means for defining the secondary pilot signals of adjacent main antenna beams of the antenna pattern orthogonal relative to each other by selecting for the secondary pilot signals modulation patterns comprising pilot symbols and being orthogonal relative to each other.

35. A system according to claim 29, further comprising means for defining the secondary pilot signals orthogonal relative to each other by selecting different spreading codes for adjacent main antenna beams.

36. A system according to claim 29, further comprising means for defining different scrambling codes for the secondary pilot signals of adjacent main antenna beams.

37. A system according to claim 29, further comprising means for transmitting the secondary pilot signals of adjacent main antenna beams with different delays in such a way that the secondary pilot signal of every other main antenna beam is delayed by a chip time.

38. A system according to claim 29, further comprising means for transmitting data intended for all users of the radio system or for a radio cell in parallel with the secondary pilot signal and with a corresponding delay.

39. A transmitter for providing a continuous uninterrupted pilot signal covering a whole antenna sector, comprising:
   means for providing at least two primary pilot signals orthogonal relative to each other;
   polarization antennas configured to form adjacent directional antenna beams;
   means for forming at least two polarization groups in such a way that in the same group the antenna beams have the same polarization, and different groups have polarizations different from each other;
   means for transmitting primary pilot signals in main antenna beams of the antenna beam pattern in the same polarization group in such a way that adjacent main antenna beams have primary pilot signals orthogonal relative to each other; and
   means for adjusting widths and directions of the antenna beams in such a way that the beams belonging to the same polarization group and having the same primary pilot signal do not overlap.

40. A transmitter for providing a continuous uninterrupted pilot signal covering a whole antenna sector, comprising:
   means for providing at least two primary pilot signals orthogonal relative each other;
   means for providing at least two secondary pilot signals orthogonal relative to each other;
   polarization antennas configured to form adjacent directional antenna beams;
   means for forming two polarization groups in such a way that in the same group the antenna beams have the same polarization, and different groups have polarizations different from each other;
   means for transmitting primary pilot signals in main antenna beams of the antenna beam pattern in the first polarization group in such a way that adjacent main antenna beams have primary pilot signals orthogonal relative to each other;
   means for transmitting secondary pilot signals in main antenna beams of the antenna beam pattern in the second polarization group in such a way that adjacent main antenna beams have secondary pilot signals orthogonal relative to each other; and
   means for adjusting widths and directions of the antenna beams in such a way that beams belonging to the same polarization group and having the same pilot signal do not overlap.

* * * * *